April 16, 1940.  E. G. SCHLUP  2,197,196
ELONGATION GAUGE
Filed March 11, 1939  2 Sheets-Sheet 1

INVENTOR.
ERNEST G. SCHLUP.
BY
ATTORNEYS.

April 16, 1940.　　　　E. G. SCHLUP　　　　2,197,196
ELONGATION GAUGE
Filed March 11, 1939　　　2 Sheets-Sheet 2

INVENTOR.
ERNEST G. SCHLUP.
BY
ATTORNEYS.

Patented Apr. 16, 1940

2,197,196

UNITED STATES PATENT OFFICE 2,197,196

ELONGATION GAUGE

Ernest G. Schlup, Middletown, Ohio, assignor to The American Rolling Mill Company, Middletown, Ohio, a corporation of Ohio Application March 11, 1939, Serial No. 261,336

15 Claims. (Cl. 80—31.1)

This application is a continuation in part of my copending application Serial No. 170,899, filed October 25, 1937, and my invention relates to a method and apparatus for measuring and indicating the elongation of a body undergoing a reduction process. More specifically it relates to a method and apparatus for checking the elongation of a strip of metal in a rolling operation. Such rolling operations may comprise hot or cold reduction processes or tempering processes and the like on conventional two, three or four high or cluster type mills.

For the purpose of determining the reduction taken on sheets of nominal length, or to determine the desired temper of such sheets, it has heretofore been necessary to determine the elongation of the sheet undergoing the reduction process, that is the measurement of the sheet length before and after the rolling process. The reduction value may then be determined by the following formula:

Reduction in percent equals $$\frac{\text{elongation in per cent} \times 100}{100 + \text{elongation in per cent.}}$$

This method, however, becomes impracticable in connection with the rolling of sheet or strip of long length, such that the strip has to be coiled. In accordance with present practice, strip length of several thousand feet is commonly encountered in cold strip mills, and clearly the above described determination would be quite impracticable.

My invention is particularly useful in determining the elongation in such cases where extremely long strip lengths are encountered. It is more particularly useful in connection with temper rolling, for in such processes the elongation values are quite low, ranging, for example, from 0.002 per cent to 0.03 per cent, and obviously any device designed to accurately indicate such elongation values must be very sensitive.

Attempts have been made in the past to employ elongation devices operating with conventional tachometers, but such attempts have been unsatisfactory because of the inaccuracy of the tachometers which ranges from 0.02 per cent to 0.03 per cent.

With the above considerations in mind, it is an object of my invention to provide a device for determining the elongation which is so accurate that it may be successfully used to determine such minute elongations as are encountered commonly in temper rolling. It is another object of my invention to provide such a device which is extremely simple and therefore suitable for use in the present day plant and which is not likely to get out of order, and is easily repaired if it should get out of order.

It is a further object of my invention to provide a device as above outlined, in which the fact of adherence to a predetermined reduction program may be visually determined in a very simple manner by a mere glance at the mechanism, the determination being so simple that any unskilled worker is capable of making it.

My invention also contemplates a novel method of rolling metal, in that the roller observes the device and makes appropriate adjustments in the rolling mechanism as changes in the predetermined elongation occur. Thereby it is made possible to roll strip of more constant gauge than has heretofore been possible. Thus my invention also comprises a novel combination of a mill with a gauging device arranged to give highly accurate indications of a variation from gauge.

These and other objects of my invention, which will be pointed out hereinafter or which will be apparent to one skilled in the art upon reading these specifications, I accomplish by that certain construction and arrangement of parts and by that certain series of process steps, of which I shall now describe exemplary embodiments. Reference is now made to the drawings forming a part hereof, and in which.

Briefly, in the practice of my invention, I provide means such as discs, adapted to contact the strip respectively on the entrance and exit sides thereof and be driven thereby. The sizes of the discs are so proportioned that for any given per cent elongation the discs will rotate at equal speeds. Therefore the ratio of the entrance disc circumference to the exit disc circumference is directly proportional to the respective strip speeds. For example, if the elongation required for a certain per cent reduction were to be one per cent and assuming that the strip on the entering side of the mill was running at unit speed, it is clear that the strip on the exit side of the mill would have to run at 1.01 times unit speed. If then the circumference of the disc on the entering side were unity, then the circumference of the disc on the exit side would have to be 1.1. It will thus be clear that if in the example given the circumference of the disc on the entering side were one foot and the circumference of the disc on the exit side were 1.1 feet and an elongation of one per cent were being produced, the two discs would rotate at equal speeds.

In the practice of my invention I compare the speeds of the discs on the entering and exit sides of the mill stroboscopically and I may thus definitely and easily determine whether or not the desired per cent elongation is being adhered to. It is, of course, understood that I provide a plurality of interchangeable discs for use on both entering and exit sides of the mill, pairs of which are designed for use in indicating certain predetermined elongations. The number of such pairs of discs will of course be dictated by the particular requirements of the mill.

Figure 1:
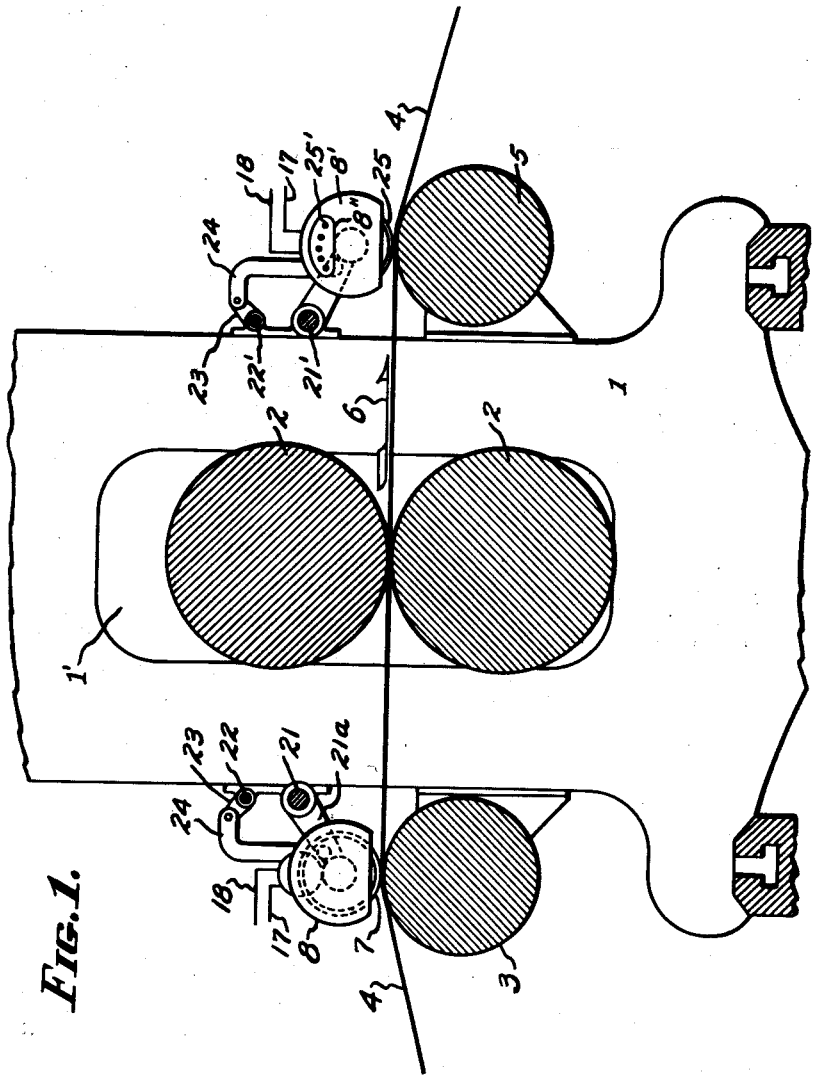
Figure 1 is a somewhat diagrammatic cross sectional view of a conventional two high mill equipped according to my invention.

Referring now to the drawings, I have shown at 1 a mill housing having mill rolls 2 supported in the housing center 1' therein. On the entering side of the mill I provide a supporting roll 3, the top of which is in a horizontal plane with the top of the mill roll 2, so that the strip 4 is fed horizontally into the mill. On the exit side of the mill I have provided a similar supporting roll 5, the top of which is also in the horizontal plane aforementioned, so that the strip 4 passes horizontally from the roll 3 between the bite of the rolls 2 and over the rolls 5. In Figure 1, I have indicated the direction of motion of strip by the arrow 6. Reeling devices may be provided on both the entry and exit sides of the mill, but I have not shown these since they form no part of my invention.

On the entering side of the mill I mount a disc 7 in a housing 8 which is hinged to the mill housing 21 by means of the arm 21a. The position of the housing may be adjusted by rotating the shaft 22 mounted on the metal housing, which shaft 22 is connected to the housing 8 by means of the linkage 23 and 24. It will be understood that the disc 7 is one of a plurality of discs of slightly different circumference which has been selected for a particular elongation, which has been determined upon. The disc 7 engages the strip 4 frictionally directly above the supporting roll 3 and drives the circuit making and breaking device through a shaft 9 and gears 10 and 11, as may better be seen in Figure 2. The circuit making and breaking device is indicated generally at 8a.

Figure 4:
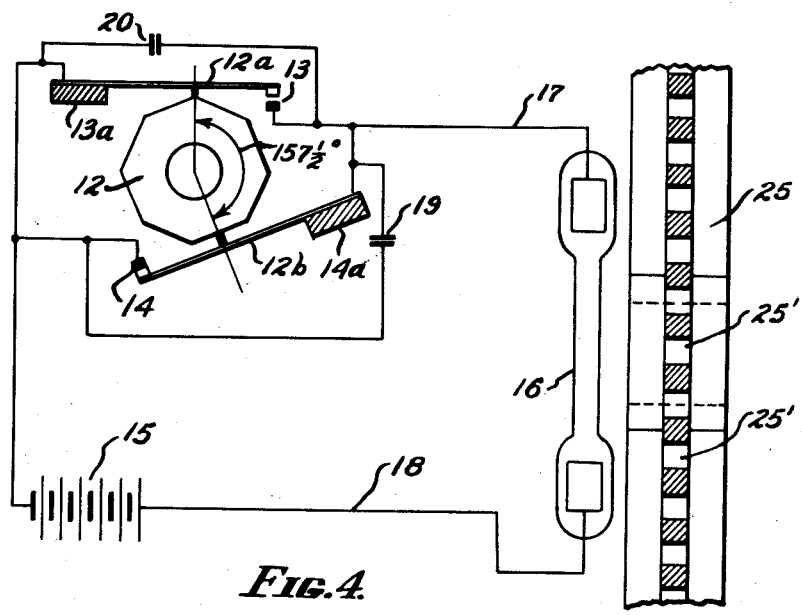
Figure 4 is an exemplary wiring diagram used in connection with my invention.

The details of the circuit making and breaking device are illustrated more clearly in the wiring diagram of Figure 4, where it may be seen that this device comprises a cam 12, which is driven from the gear 11, and the followers 12a and 12b. The followers may be of any desired form but I prefer to make them from a resilient material, and mount them on the blocks 13a and 14a, so that they will be urged toward the shaft of the cam. In the particular embodiment illustrated, I have shown an octagonal cam and for the purpose of increasing the frequency of make and break, I have shown the two breakers 13 and 14 which are adapted to act in alternating sequence. For this purpose I have displaced the axis of the breaker 14 so that the angle of the cam between the points at which the followers contact the cam is 157½ degrees. The breakers 13 and 14 are by-passed respectively by the condensers 20 and 19 in order to prevent arcing in accordance with conventional practice. The two breakers are connected in parallel and the breaker circuit is in series with a source of potential 15, and a neon lamp 16, by means of the leads 17 and 18.

It will be clear from a study of Figure 4 that as the cam 12 rotates from the position in which it is shown and in which the contact 13 is open and the contact 14 is closed, the contact 13 will be closed and the contact 14 will be open, and there will be a short interval during which both contacts will be open. It will also be understood that in the arrangement shown there will be sixteen breaks per revolution of the cam 12, that is there will be sixteen points during which both the contacts 13 and 14 will be open. It should, of course, be understood that the two breakers could be connected in series, and in such case, the cam 12 would have to be so designed that there would be certain times during which both the contacts 13 and 14 were closed.

Figures 2, 3:
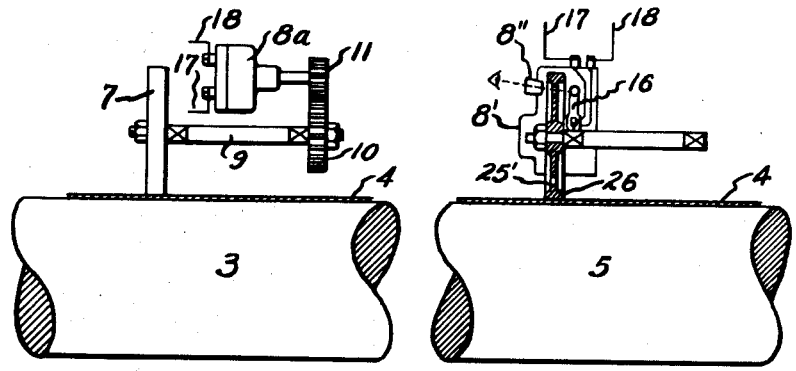
Figure 2 is an elevational view taken at right angles to the view of Figure 1, showing a device used on one side of the mill.
Figure 3 is a view similar to Figure 2, showing the device used on the other side of the mill.

Referring now to Figure 3, I have shown a disc 25 which is similar to the disc 7 on the entering side of the mill and which, of course, is chosen to be of the appropriate circumference, as above outlined and which is perforated annularly as indicated at 25'. The number of holes 25' in the disc 25 must of course be equal to the number of circuit makes and breaks per revolution of the disc 7 which in the instance shown would be sixteen. The neon light 16 discussed above, is located behind this disc opposite the locus of the holes 25'. The disc 25 is of course mounted similarly to the disc 7 except that the housing 8' is provided with an opening 8" through which a number of the holes in the disc 25 may be visible.

It will now be clear to any one who is familiar with stroboscopic effects that if the discs 7 and 25 are rotating at equal speeds (which according to my hypothesis indicates that the desired predetermined elongation is being achieved) the series of holes 25' visible through the opening 8", will appear to stand still. If, however, the elongation is too great, the holes 25 will appear to move counterclockwise; while if the elongation is insufficient the holes will appear to move clockwise. The mill operator by keeping his eye on the opening 8" and observing the apparent movement of the holes 25" may correct the elongation by means of a mill screw down adjustment, until the holes 25' appear stationary, indicating a correct elongation.

Although I have indicated the making and breaking device as located on the entering device, and the stroboscopic device as located on the exit side of the mill, it is to be understood that the location of these devices could be reversed without any change in effect.

It will further be understood that modifications may be made in my invention without departing from the spirit thereof, and that I do not intend to limit myself otherwise than as specifically pointed out in the claims which follow.

Having now fully described my invention what I claim as new and desire to secure by Letters Patent, is:

1. The method of determining the adherence of a mill to a predetermined per cent elongation, which includes the steps of causing the strip at the entrance and exit sides of the mill respectively, to drive rotative elements at equal speeds when said predetermined elongation is being produced, and causing said rotative elements to cooperate to indicate the relation of said speeds stroboscopically.

2. The method of determining the adherence of a mill to a predetermined per cent elongation, which includes the steps of causing the strip at the entrance and exit sides of the mill, respectively, to drive rotative elements at equal speeds when said predetermined elongation is being produced, and causing one of said rotative elements to actuate an element which is in stroboscopic relation with the other of said elements.

3. An elongation gauge for rolling mills, comprising members adapted to be rotated by the strip on the entering and exit sides of the mill respectively, the sizes of said members being so proportioned that the rotative speeds of said members will be equal when the elongation is as predetermined, and an element actuated by one of said members and disposed in stroboscopic relation with the other of said members, whereby the equality of speeds of said members may be visually checked.

4. An elongation gauge for rolling mills, comprising members adapted to be rotated by the strip on the entering and exit sides of the mill respectively, the sizes of said members being so proportioned that the rotative speeds of said members will be equal when the elongation is as predetermined, one of said members comprising a stroboscopic disc, and the other of said members being in driving relation with a make-and-break device, said device being in a circuit with a light source placed behind said stroboscopic disc.

5. An elongation gauge for rolling mills, comprising members adapted to be rotated by the strip on the entering and exit sides of the mill respectively, the sizes of said members being so proportioned that the rotative speeds of said members will be equal when the elongation is as predetermined, one of said members comprising an annularly perforated disc, a make-and-break device in operative relation with the other of said members, and a light source disposed behind said disc and connected to said make-and-break device, whereby the elongation may be checked stroboscopically.

6. An elongation gauge for rolling mills, comprising members adapted to be rotated by the strip on the entering and exit sides of the mill respectively, the sizes of said members being so proportioned that the rotative speeds of said members will be equal when the elongation is as predetermined, one of said members comprising an annular perforated disc, a make-and-break device in operative relation with the other of said members, and a light source disposed behind said disc and connected to said make-and-break device, the number of perforations in said disc and the number of makes and breaks per revolution of said other member being equal, whereby the elongation may be checked stroboscopically.

7. The method of rolling metal which includes the steps of passing the metal through a reducing instrumentality, causing the metal at the entrance and exit sides of the mill respectively, to drive rotative elements at equal speeds when a predetermined elongation is being produced, causing said rotative elements to cooperate to indicate the relation of said speeds stroboscopically, and adjusting said reducing instrumentality in accordance with said indications.

8. In combination, a rolling mill, members adapted to be rotated by the strip on the entering and exit side of said mill respectively, the sizes of said members being so proportioned that the rotative speeds of said members will be equal when the elongation produced by said mill is as predetermined, and an element actuated by one of said members and disposed in stroboscopic relation with the other of said members, whereby the elongation being produced by said mill as compared to that predetermined, may be visually checked.

9. The method of determining the adherence of a mill to a predetermined per cent elongation, which includes the steps of causing the strip at the entrance and exit sides of the mill respectively, to drive rotative elements at definitely related speeds when said predetermined elongation is being produced, and causing said rotative elements to cooperate to indicate the relation of said speeds stroboscopically.

10. The method of determining the adherence of a mill to a predetermined per cent elongation, which includes the steps of causing the strip at the entrance and exit sides of the mill respectively, to drive rotative elements at definitely related speeds when said predetermined elongation is being produced, and causing one of said rotative elements to actuate an element which is in stroboscopic relation with the other of said elements.

11. An elongation gauge for rolling mills, comprising members adapted to be rotated by the strip on the entering and exit sides of the mill respectively, the sizes of said members being so proportioned that the rotative speeds of said members will be definitely related when the elongation is as predetermined, and an element actuated by one of said members and disposed in stroboscopic relation with the other of said members, whereby the relation of speeds of said members may be visually checked.

12. An elongation gauge for rolling mills, comprising members adapted to be rotated by the strip on the entering and exit sides of the mill respectively, the sizes of said members being so proportioned that the rotative speeds of said members will be definitely related when the elongation is as predetermined, one of said members comprising a stroboscopic disc, and the other of said members being in driving relation with a make-and-break device, said device being in a circuit with a light source placed behind said stroboscopic disc.

13. An elongation gauge for rolling mills, comprising members adapted to be rotated by the strip on the entering and exit sides of the mill respectively, the sizes of said members being so proportioned that the rotative speeds of said members will be definitely related when the elongation is as predetermined, one of said members comprising an annular perforated disc, a make-and-break device in operative relation with the other of said members, and a light source disposed behind said disc and connected to said make-and-break device, the number of perforations in said disc and the number of makes and breaks per revolution of said other member being similarly related, whereby the elongation may be checked stroboscopically.

14. The method of rolling metal which includes the steps of passing the metal through a reducing instrumentality, causing the metal at the entrance and exit sides of the mill respectively, to drive rotative elements at definitely related speeds when a predetermined elongation is being produced, causing said rotative elements to cooperate to indicate the relation of said speeds stroboscopically, and adjusting said reducing instrumentality in accordance with said indications.

15. In combination, a rolling mill, members adapted to be rotated by the strip on the entering and exit side of said mill respectively, the sizes of said members being so proportioned that the rotative speeds of said members will be definitely related when the elongation produced by said mill is as predetermined, and an element actuated by one of said members and disposed in stroboscopic relation with the other of said members, whereby the elongation being produced by said mill as compared to that predetermined, may be visually checked.

ERNEST G. SCHLUP.